(12) United States Patent
Bansho et al.

(10) Patent No.: US 6,531,108 B1
(45) Date of Patent: Mar. 11, 2003

(54) PROCESS FOR PRODUCING FREE HYDROXYLAMINE AQUEOUS SOLUTION

(75) Inventors: Kumiko Bansho, Shiga (JP); Yoshio Noguchi, Shiga (JP)

(73) Assignee: Toray Fine Chemicals Co., Ltd. (JP)

( * ) Notice: Subject to any disclaimer, the term of this patent is extended or adjusted under 35 U.S.C. 154(b) by 0 days.

(21) Appl. No.: 09/619,156

(22) Filed: Jul. 19, 2000

(30) Foreign Application Priority Data

Mar. 13, 2000 (JP) .......................................... 2000-68354

(51) Int. Cl.$^7$ .............................................. C01B 21/20
(52) U.S. Cl. ........................... 423/387; 203/63; 203/66; 423/545; 423/551
(58) Field of Search ................................ 423/387, 388, 423/545, 551; 203/63, 66

(56) References Cited

U.S. PATENT DOCUMENTS 4,778,669 A * 10/1988 Fuchs et al. ................. 423/387
5,837,107 A * 11/1998 Watzenberger et al. ..... 423/387
6,299,734 B1 * 10/2001 Watzenberger et al. ..... 423/387

* cited by examiner

*Primary Examiner*—Wayne A. Langel
(74) *Attorney, Agent, or Firm*—Schnader Harrison Segal & Lewis LLP

(57) ABSTRACT

This invention provides a highly pure and highly concentrated free hydroxylamine aqueous solution substantially not containing any salt or organic substance.

This invention is a process for obtaining a free hydroxylamine aqueous solution, comprising the steps of letting an aqueous solution or slurry containing hydroxylammonium sulfate and an alkali react with each other, to obtain an aqueous solution or slurry containing free hydroxylamine and dissolved or partially precipitated sulfates; mixing the obtained reaction solution and a lower alcohol, to precipitate solid sulfates; separating a solution containing the lower alcohol and some of water by distillation from the aqueous solution remaining after separating and removing the solid sulfates; and obtaining a free hydroxylamine aqueous solution from the remaining solution by distillation.

30 Claims, 1 Drawing Sheet

PROCESS FOR PRODUCING FREE HYDROXYLAMINE AQUEOUS SOLUTION

BACKGROUND OF THE INVENTION

The present invention relates to a process for producing a free hydroxylamine aqueous solution, in more detail, a process for producing a free hydroxylamine aqueous solution, in which hydroxylammonium sulfate and an alkali are caused to react with each other for obtaining free hydroxylamine, comprising the steps of adding a lower alcohol for precipitating the sulfates produced in the reaction, to separate and remove them, separating the lower alcohol by distillation, and obtaining a free hydroxylamine aqueous solution by distillation from the remaining solution.

PRIOR ART

Hydroxylamine is industrially widely used as a medical and agricultural intermediate raw material or as a metal surface treating agent, etc.

However, since free hydroxylamine is very unstable and is easily decomposed, it is generally converted into a relatively stable hydroxylamine salt (hydroxylammonium salt) for use. The decomposition of free hydroxylamine is especially likely to occur, for example, in the presence of heavy metal ions, at a high concentration, in a strong alkali or at a relatively high temperature.

When hydroxylamine is actually used in the above applications, free hydroxylamine, not a hydroxylammonium salt, is preferably used, and an aqueous solution containing free hydroxylamine at a higher concentration is often required. Such a free hydroxylamine aqueous solution has been obtained by several methods.

For example, in U.S. Pat. Nos. 4,147,623, 4,202,765, 5,788,946 and 5,872,295, a free hydroxylamine aqueous solution is liberated from a hydroxylammonium salt aqueous solution containing impurities by using an ion exchange resin. However, the hydroxylamine concentration in the obtained aqueous solution is low, and hydroxylamine expedites the degradation of the ion exchanger, to cause much temporal and economical waste.

Furthermore, as described in German Patent Publication No. 3347259, there is also a method of obtaining a free hydroxylamine aqueous solution by electrodialysis in an electrolyte from a hydroxylammonium salt aqueous solution contained in an electrolytic cell having a semipermeable membrane, but the method is technically complicated and low in yield. Furthermore, the equipment cost is high. So, the method is not yet established industrially.

A recent method for obtaining free hydroxylamine uses the reaction between a hydroxylammonium salt and an alkali. This reaction system contains a large amount of a salt formed by the anions derived from the hydroxylammonium salt and the cations derived from the alkali. So, various attempts are made to separate the salt and free hydroxylamine, for obtaining more highly pure free hydroxylamine at a higher concentration.

In the methods described in U.S. Pat. Nos. 4,707,294, 4,551,323, 4,551,324 and 4,956,168, an alcohol solution of free hydroxylamine is obtained by removing the sulfates precipitated in the reaction between hydroxylammonium sulfate and an alkali or alkali alcoholate in an alcohol. This alcohol solution is then mixed with a reagent such as an acid other than sulfuric acid or a ketone, to be used for synthesizing a hydroxylammonium salt other than hydroxylammonium sulfate or an oxime, etc. German Patent Publication No. 1247282 discloses a method in which an alcohol solution of free hydroxylamine is obtained by removing the ammonium sulfate precipitated in the reaction between hydroxylammonium sulfate and ammonia in an alcohol. However, these reactions in an alcohol are low in productivity and yield since the solubility of hydroxylammonium sulfate is low, and to improve the disadvantage, complicated equipment such as a powerful stirrer is required for the reaction system. Furthermore, in these methods, since the salt dissolved in the alcohol solution remains in the product, the purity of the product comes into question.

In German Patent Publication No. 3601803 (Japanese Patent Laid-Open (Kokai) No. Sho62-171905 and U.S. Pat. No. 4,778,669), as described above, an alcohol solution of free hydroxylamine is obtained by removing the ammonium sulfate precipitated in the reaction between hydroxylammonium sulfate and ammonia in a lower alcohol. Furthermore, a hydroxylamine stabilizer and water are added to the alcohol solution, and the alcohol is separated by distillation, to obtain a free hydroxylamine aqueous solution. However, since this method is also a reaction in an alcohol, the productivity and yield are low because of the low solubility of hydroxylammonium sulfate, and to improve the disadvantage, complicated equipment such as a powerful stirrer is required for the reaction system. Moreover, since the aqueous solution as a product is the residue of distillation, coloration and the ingress of ammonium sulfate and heavy metals come into question.

It can be seen that a consistent reaction using an alcohol solvent only is not preferable in view of productivity, yield, equipment and quality.

In the method disclosed in German Patent Publication No. 3528463, hydroxylammonium sulfate with a low ammonium ion content and the oxide and/or hydroxide of calcium, strontium or barium are caused to react with each other in water, and the alkaline earth metal sulfate is separated, to obtain a free hydroxylamine aqueous solution. Since the alkaline earth metal sulfate is generally low in the solubility in water, the grain size is extremely small, and it is difficult to industrially separate the solid. Furthermore, in this method, no other operation than precipitation is attempted for separating sulfates, and the obtained aqueous solution contains sulfates by amounts corresponding to the solubilities. By the way, as for the hydroxylammonium sulfate used for this reaction, the hydroxylammonium sulfate aqueous solution as the raw material must be crystallized several times, to decrease the ammonium ion content beforehand. Furthermore, the strontium compounds and barium compounds are relatively expensive and highly toxic. So, this method is not appropriate for industrial production.

In U.S. Pat. Nos. 5,472,679 and 5,266,290, hydroxylammonium sulfate and the oxide and/or hydroxide of an alkali metal or an alkaline earth metal are caused to react with each other in water not containing any alcohol, to obtain a reaction solution containing free hydroxylamine, and from the reaction solution, a highly concentrated free hydroxylamine aqueous solution not containing any alcohol is obtained by simple distillation at 65° C. or lower. The sulfates precipitated in this reaction are removed before distillation, but since the aqueous solution contains much salts dissolved, much salts are precipitated in the residue in the subsequent simple distillation operation, making the simple distillation operation difficult. Furthermore, since free hydroxylamine with a boiling point higher than that of water is deposited on the precipitated salts, the yield of free hydroxylamine is extremely lowered. So, the method is not industrially advantageous.

In German Patent Publication No. 19547758 (U.S. Pat. No. 5,837,107), hydroxylammonium sulfate and an alkali are caused to react with each other in water not containing any alcohol, and the precipitated salt is removed. Then, the reaction solution is supplied to an intermediate stage of a column, and separated into a hydroxylamine aqueous solution not containing the salt discharged from an upper stage and an aqueous solution containing the salt discharged from a lower stage. In this case, the amount of the water or steam supplied from a lower stage countercurrently must be large for effecting distillation at a high temperature of 80° C. or higher for easier distillation operation and for decreasing the discharge of free hydroxylamine from the lower stage to raise the yield, but it lowers the hydroxylamine concentration of the free hydroxylamine aqueous solution obtained from the column top. So, to achieve a necessary free hydroxylamine concentration, in most cases, subsequent concentration is necessary. Thus, the method is not industrially advantageous.

Japanese Patent Laid-Open (Kokai) No. Sho55-71609 proposes a method for obtaining highly pure crystalline hydroxylammonium sulfate. In this method, a raw solution obtained by introducing sulfurous acid gas into an aqueous solution of a sulfite and an acid sulfite is heated and hydrolyzed, to produce a mixture consisting of hydroxylammonium sulfate, ammonium sulfate and sulfuric acid according to the Raschig's method, and the mixture is adjusted in pH. To the solution, an alcohol is added, and a solid mainly composed of ammonium sulfate is separated. From the residue, the ammonium sulfate, sulfuric acid and other impurities contained in the raw material are removed, to obtain a transparent solution. To the solution, sulfuric acid is added again to obtain highly pure crystalline hydroxylammonium sulfate. While the present invention relates to a process for obtaining free hydroxylamine from hydroxylammonium sulfate, particularly a process for obtaining highly pure free hydroxylamine at a high concentration at a high yield, the invention disclosed in Japanese Patent Laid-Open (Kokai) No. Sho55-71609 describes an impurities removing means for obtaining highly pure crystalline hydroxylammonium sulfate from a special raw mixture containing a large quantity of impurities. So, the latter invention is quite different from the present invention in object and method.

OBJECTS OF THE INVENTION

The object of the present invention is to solve the above problems, by providing a process for obtaining a highly pure and highly concentrated free hydroxylamine aqueous solution substantially not containing any salt or organic substance at a high efficiency.

In general, if a hydroxylammonium salt is treated by an alkali, a salt is produced in a large amount. In this invention, this salt is decreased beforehand, to simplify the subsequent distillation operation. Furthermore, since the lower alcohol mixed for the purpose of precipitating the salt can be obtained together with water by distillation, there is no danger of inflammability, and the recovered distillate can be recycled for effective use preferably in view of environmental conservation.

Other objects of this invention will be clarified in the following description.

BRIEF DESCRIPTION OF THE INVENTION

This invention intended to achieve the above objects is a process for producing a free hydroxylamine aqueous solution, comprising the steps of letting an aqueous solution or slurry containing hydroxylammonium sulfate and an alkali react with each other, to obtain an aqueous solution or slurry (reaction solution) containing free hydroxylamine and dissolved or partially precipitate sulfates; mixing the obtained reaction solution and a lower alcohol, to precipitate solid sulfates; separating a solution containing the lower alcohol and some of water by distillation from the aqueous solution remaining after separating and removing the solid sulfates; and obtaining a free hydroxylamine aqueous solution from the remaining solution by distillation under reduced pressure.

The process for producing a free hydroxylamine aqueous solution of this invention includes the following preferable modes.

The sulfates produced by the reaction between hydroxylammonium sulfate and an alkali can be mostly precipitated by mixing a required amount of a lower alcohol with the reaction system, and can be separated and removed as solid sulfates.

The mixed lower alcohol can be separated by distillation from the reaction solution, and recovered and recycled for re-use in the reaction system advantageously in view of economy and environmental conservation.

After the solid sulfates are separated, the hydroxylamine deposited on the sulfates is washed away by a lower alcohol. The lower alcohol containing hydroxylamine obtained by this operation can be re-added to the reaction system for recycling.

To prevent the decomposition of free hydroxylamine, a stabilizer is added into the system containing free hydroxylamine.

The free hydroxylamine aqueous solution can be obtained safely as a highly pure product substantially not containing any salt because of distillation under reduced pressure. Furthermore in this invention, the residue remaining after obtaining the product by distillation can be recycled in the reaction system to greatly improve the yield of the reaction system as a whole, and even if the residue is recycled, the purity of the product is not substantially lowered.

DETAILED DESCRIPTION OF THE INVENTION

Figure 1:
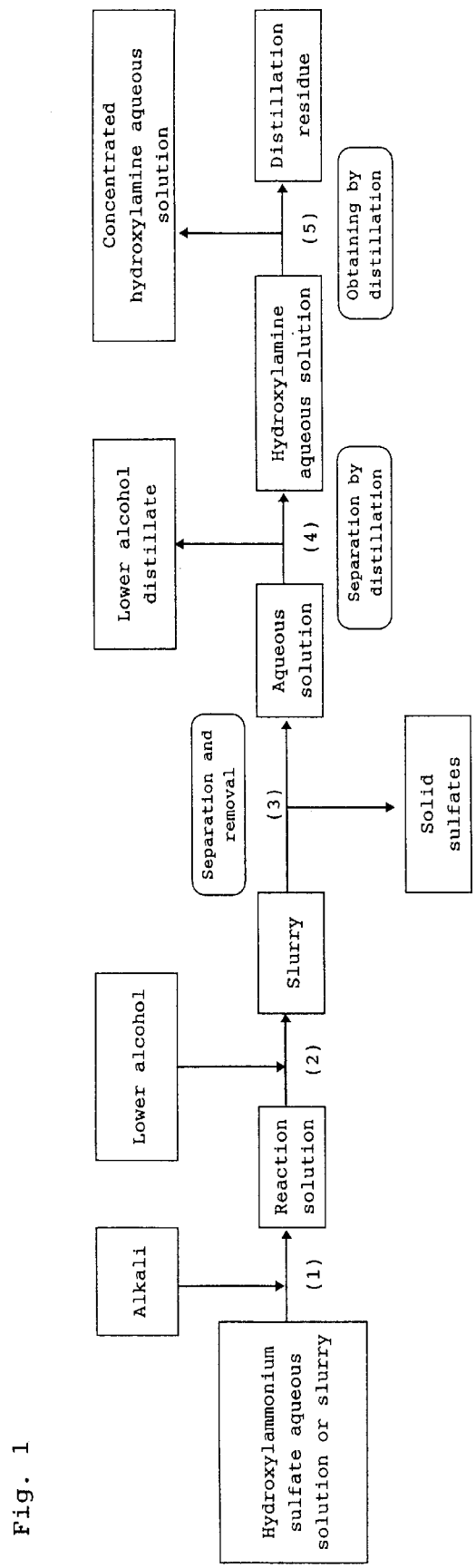
FIG. 1 is a model diagram for illustrating the general operation in the process for producing a free hydroxylamine aqueous solution of this invention.

The basic process for producing a free hydroxylamine aqueous solution of this invention consists of the following steps (1) to (5). FIG. 1 is a model diagram for illustrating the general operation in the process for producing a free hydroxylamine aqueous solution of this invention, and the numbers (1) to (5) in the drawing correspond to the following step Nos. (1) to (5).

(1) An alkali is mixed with an aqueous solution or slurry containing hydroxylammonium sulfate, for reaction.

(2) A lower alcohol is mixed with the obtained reaction solution, to precipitate solid sulfates.

(3) The precipitated solid sulfates are separated and removed, to obtain an aqueous solution.

(4) The aqueous solution is distilled, to separate a solution containing the lower alcohol and some of water.

(5) From the residue, a free hydroxylamine aqueous solution is obtained by distillation under reduced pressure.

This invention relates to a process for synthesizing a free hydroxylamine aqueous solution. For efficient and safe synthesis, it is preferable observe the following conditions.

The aqueous solution or slurry containing hydroxylammonium sulfate used in this invention can be obtained by any method. For example, it can be obtained according to the nitrogen monoxide reduction method, or can be a solution obtained by dissolving powdery hydroxylammonium sulfate into water, or can also be their mixture. Furthermore, any of these solutions may have a lower alcohol mixed to some extent, or may also contain free hydroxylamine or an inorganic substance such sodium sulfate or ammonium sulfate to some extent.

On the other hand, the alkali to be mixed for reaction with the aqueous solution or slurry containing hydroxylammonium sulfate can be any alkali which can act to liberate hydroxylamine from hydroxylammonium sulfate. The alkalis which can be used here include, for example, ammonia, alkali metal hydroxides, alkaline earth metal oxides or hydroxides, etc. In this invention, especially ammonia or sodium hydroxide is appropriate, and their mixture can also be used.

If the alkali is ammonia, the produced ammonium sulfate is highly soluble in water and very unlikely to be precipitated in the reaction system preferably in view of operation. The ammonia used can be gaseous or liquid, and may contain water or a lower alcohol to some extent. The use of ammonia gas is especially preferable since the free hydroxylamine concentration can be enhanced.

If the alkali is sodium hydroxide, the produced sodium sulfate is highly soluble in water at higher than room temperature and is unlikely to be precipitated in the reaction system for allowing easy operation. Furthermore, since it can be removed as decahydrate by later precipitation or other separating operation, it can enhance the free hydroxylamine concentration. It is appropriate to use sodium hydroxide as an aqueous solution, but it can also contain a lower alcohol to some extent, or even sodium alcoholate. The use of sodium alcoholate is preferable for enhancing the free hydroxylamine concentration. Potassium hydroxide generally used as an alkali is inferior to ammonia and sodium hydroxide since the potassium sulfate produced by reaction is relatively low in solubility in water and since it is more expensive than ammonia and sodium hydroxide.

Since the reaction between hydroxylammonium sulfate and an alkali in this invention is exothermic, temperature control is required for safety and disaster prevention. Specifically it is preferable that the temperature of the reaction between hydroxylammonium sulfate and an alkali in water is 60° C. or lower. More preferable is 40° C. or lower. A practical and suitable temperature range is 20 to 40° C.

It is desirable that the above reaction is effected in an apparatus equipped with a pH meter and is terminated at pH 9.0–9.2. At pH 9.2, since the alkali cannot be excessive, the decomposition reaction of free hydroxylamine in an alkaline condition can be inhibited. After completion of reaction, a solution consisting of free hydroxylamine and the remaining amount of sulfates including hydroxylammonium sulfate is obtained, and the sulfates may be perfectly dissolved in the solution or may be partially precipitated.

To cause the sulfates dissolved in water to be precipitated more, it is preferable to mix them with a lower alcohol since the produced sulfates are less soluble in the lower alcohol than in water and since the lower alcohol is perfectly compatible with water. Especially to allow separation by distillation, a lower alcohol with a boiling point lower than that of water is preferable, and specifically an aliphatic alcohol with 1 to 3 carbon atoms is preferable. Especially if methanol is used, the differences in boiling point from water and hydroxylamine are large to allow easy separation by distillation.

The solid sulfates can be separated by a publicly known conventional means, but centrifugation is excellent in view of efficiency. It is preferable to wash away the hydroxylamine deposited on the sulfates by a lower alcohol, and the washing can be slurry washing or rinsing in a centrifuge.

If the solid sulfates are precipitated during reaction, it is preferable that the lower alcohol added for sulfate precipitation is added to the aqueous solution remaining after separating and removing the solid sulfates, but it can also be added to the slurry containing the solid sulfates not separated. As another method, powdery hydroxylammonium sulfate and an alkali can be added to the aqueous solution remaining after separating and removing the solid sulfates, and the solid sulfates precipitated there can be separated and removed again, then a lower alcohol being added for enhancing the free hydroxylamine concentration in the aqueous solution. If the separation and removal of the precipitated solid sulfates and the addition of powdery hydroxylammonium sulfate and an alkali are effected continuously, the operation is simple, but batch operation is more advantageous in view of yield. After the separation and removal of the precipitated solid sulfates and the addition of powdery hydroxylammonium and an alkali are repeated to further enhance the free hydroxylamine concentration in the system, a lower alcohol can be mixed to enhance the free hydroxylamine concentration in the product. It is preferable that the amount of the lower alcohol mixed is not less than 1.5 times the amount of water used as a reaction solvent. More preferable is 3 times or more.

In this invention, the lower alcohol obtained by distillation from the reaction filtrate remaining after separating and removing the solid sulfates, and the lower alcohol used for washing the sulfates can be recovered to be recycled, for solving the problem of alcohol treatment. Furthermore, since the hydroxylamine contained in the alcohol can also be recovered, the yield of free hydroxylamine also improves.

The aqueous solution containing a lower alcohol and some of water obtained by distillation can be recycled to be re-used as it is, but if it is rectified and concentrated further to be enhanced in alcohol concentration for recycling, more efficient precipitation can be effected to prevent the free hydroxylamine concentration from declining.

On the other hand, if sulfuric acid is added to the aqueous solution remaining after separating and removing the lower alcohol, to convert the free hydroxylamine partially dissolved in the aqueous solution into hydroxylammonium sulfate, for recycling the hydroxylammonium sulfate aqueous solution, then free hydroxylamine can be obtained at a higher yield. Moreover, to enhance the free hydroxylamine concentration, it is desirable to concentrate the hydroxylammonium sulfate aqueous solution before recycling.

The reaction filtrate remaining after separating and removing the solid sulfate can also be supplied to a rectifying column, so that the lower alcohol containing a slight amount of water obtained from the column top may be used as it is for recycling.

The separation between the lower alcohol and water by distillation can be effected at 80° C. or lower at atmospheric pressure or under reduced pressure. However, to prevent the decomposition of free hydroxylamine, distillation under reduced pressure at 60° C. or lower is preferable. A practical and suitable temperature range is 30 to 60° C., and a practical and suitable pressure range is 100 to 130 hPa. The subsequent distillation for obtaining the free hydroxylamine aqueous solution must be effected under reduced pressure. Specifically distillation at 80° C. or lower at 100 hPa or lower is desirable, and distillation at 60° C. or lower is more preferable. Practical and preferable temperature and pressure ranges are 30 to 60° C. and 30 to 100 hPa.

It is preferable in view of industrial use of the product, that the hydroxylamine concentration of the diluted free hydroxylamine aqueous solution remaining after separating the lower alcohol by distillation is 3 wt % or more. More preferable is 10 wt % or more, and further more preferable is 29 wt % or more. It is also desirable in view of industrial use of the product, that the hydroxylamine concentration of the highly concentrated free hydroxylamine aqueous solution operated by distillation from the diluted solution is 30 wt % or more. The process of this invention allows a product with a hydroxylamine concentration of 30 wt % or more to be obtained.

As a particular method, hydroxylammonium sulfate and an alcohol can be added continuously or batch-wise to the solution remaining after separating and removing the solid sulfates precipitated in the reaction between hydroxylammonium sulfate and an alkali, and the solid sulfates precipitated continuously or batch-wise can be separated and removed. This operation is repeated, and a lower alcohol is mixed. According to this method, the free hydroxylamine concentration in the free hydroxylamine aqueous solution obtained by the subsequent operation to separate the lower alcohol and some of water by distillation can be 30 wt % or more. Furthermore, the free hydroxylamine concentration in the highly concentrated free hydroxylamine aqueous solution obtained by distillation from said free hydroxylamine aqueous solution can be 35 wt % or more. Achieving a concentration of almost 50 wt % is preferable in view of industrial use.

It is preferable to add a hydroxylamine stabilizer to the reaction system during the series of operation steps in this invention and/or to the free hydroxylamine aqueous solution obtained after completion of the operation steps. For example, if a stabilizer is added during the reaction between hydroxylammonium sulfate and an alkali, the reaction balance may be improved. Furthermore, if a stabilizer is added when the solution containing a lower alcohol and some of water is separated by distribution, and/or when the free hydroxylamine aqueous solution is obtained by filtration, and/or when the free hydroxylamine aqueous solution is rectified and concentrated, the decomposition of free hydroxylamine in those steps can be prevented preferably in view of better process balance and safe process operation.

Moreover, if a stabilizer is added to the finally obtained free hydroxylamine aqueous solution, the free hydroxylamine aqueous solution can be stored more stably.

The hydroxylamine stabilizer can be 8-aminoquinoline or 8-hydroxyquinoline, and especially 8-aminoquinoline can be preferably used. As for the amount of the stabilizer added, 50 ppm or less based on the amount of free hydroxylamine is effective. A preferable range is 5 to 20 ppm.

The decomposition of free hydroxylamine includes the decomposition by the oxidation-reduction reaction which takes place with heavy metal ions as a catalyst. As a stabilizer to prevent the decomposition, it is effective to add 8-aminoquinoline or 8-hydroxyquinoline to the system containing free-hydroxylamine, since 8-aminoquinoline or 8-hydroxyquinoline forms a chelate with heavy metal ions, to inactivate the catalytic action of the heavy metal ions.

Since the residue remaining after distilling away the free hydroxylamine aqueous solution contains large amounts of hydroxylamine and unreactive hydroxylammonium sulfate, recycling some or all of the residue greatly improves the yield. It is preferable to stop the concentration of the residue before any salt is precipitated, since the contamination in the system can be inhibited, but a salt may be precipitated. If a salt is precipitated, the solid can be separated and removed before recycling, but it is preferable to recycle the residue as it is. In usually practiced chemical processes, recycling almost all the residue lowers the yield and/or lowers the product purity. However, surprisingly, in the process of this invention, even if almost all the residue is recycled, any side effect does not occur.

In this way, this invention provides a high yield industrial process for producing free hydroxylamine, which cannot be achieved by conventional processes. Industrially it is desirable to remove some of the residue outside the system, since perfect recycling enhances the heavy metal concentration.

The free hydroxylamine aqueous solution finally obtained in the process of this invention contains 1 ppm or less of Fe and 50 ppm or less of $SO_4^{2-}$ as impurities, showing a very high quality. Furthermore, for example by controlling the product distilling-out rate, the Fe content can be kept at 10 ppb or less, and this product can be suitably used as a material for electronics. Especially it is especially significant to use a highly pure low Fe content product obtained by this invention, as one ingredient of the resist removing liquids for semiconductors and LCD. That is, in the electronics material industry, there has been a long-time unfilled demand for a highly pure free hydroxylamine aqueous solution low in metal content, and the process of this invention allows it to be supplied industrially at low cost.

EXAMPLES

This invention is described below more particularly in reference to examples, but is not limited thereto or thereby.

Example 1

A 2-liter four-neck flask with a gas blow-in port, thermometer, pH meter and stirrer was charged with 234.5 g of commercially available powdery hydroxylammonium sulfate and 234.5 g of water, and 8-hydroxyquinoline was added as a chelate producing stabilizer by about 0.0006 mole for each mole of hydroxylammonium sulfate. With stirring, ammonia gas was supplied at 20 to 25° C. till a pH of 9.2 was reached, and again 234.5 g of powdery hydroxylammonium sulfate was supplied. And also at 20 to 25° C., ammonia gas was supplied till a pH of 9.2 was reached. To the reaction mixture formed like a slurry by the precipitated solid ammonium sulfate, 545 g of methanol was added dropwise at 20 to 25° C., taking 1.5 hours. During the dropwise addition, the dissolved sulfates began to be precipitated, but the stirring property was not especially worsened, allowing the addition of methanol to be completed. Then, the slurry was filtered, and the separated cake was washed by 200 g of methanol. The amount of the filtrate joined with the washing was 1,146 g, which contained 185 g of free hydroxylamine. On the washed cake, 0.2 g of free hydroxylamine was deposited. This means that though the raw material used contained 189.8 g of hydroxylamine, 185.2 g of free hydroxylamine in total was produced. The filtrate was evaporated by a rotary evaporator at a reduced pressure of 110 hPa till the bottom temperature reached 38° C., to distill away methanol. Thus 463 g of a distillation residue containing 174.1 g of free hydroxylamine was obtained. The distilled-away 680 g of methanol containing some water contained 7.9 g of free hydroxylamine. The distillation residue was distilled at a reduced pressure of 70 hPa till the bottom temperature reached 46° C., to remove water. The distilled-away 197 g of water containing some methanol contained 5.8 g of free hydroxylamine, and a stoichiometric amount of sulfuric acid was added, to make a hydroxylammonium sulfate aqueous solution which was dehydrated and concentrated for re-use as a highly concentrated raw material. The distillation residue remaining after removing water was distilled at a reduced pressure of 30 hPa till the bottom temperature reached 60° C., to remove the free hydroxylamine aqueous solution. Thus, 265.1 g of a distillate containing 136.7 g of free hydroxylamine with a hydroxylamine content of 51.6% was obtained. The final distillation residue contained 15.5 g of hydroxylammonium sulfate produced as a result of distillation and decomposition of 19.1 g of free hydroxylamine and a dissolved amount of ammonium sulfate. From 185.0 g of hydroxylamine content subjected to distillation, 136.7 g of hydroxylamine was distilled out as an about 50% aqueous solution, and 13.7 g of hydroxylamine was distilled out together with the initially distilled out methanol and water. Furthermore, the distillation residue contained 25.3 g of hydroxylamine as calculated from hydroxylammonium. So, 175.7 g of hydroxylamine which corresponded to 95.0% of the hydroxylamine content subjected to distillation existed as a product.

When no stabilizer was added during reaction, hydroxylamine was remarkably decomposed due to produced ammonia gas when the hydroxylamine aqueous solution was distilled out. So, the distillation experiment was stopped halfway.

The distilled-out 51.6% free hydroxylamine aqueous solution was colorless and transparent, and contained 1 ppb of Fe and less than 50 ppm of $SO_4^{2-}$, showing a high quality. When 8-aminoquinoline was added as a stabilizer by 0.00005 mole for each mole of hydroxylamine, the aqueous solution could be allowed to stand stably at room temperature for a long time.

Example 2

An experiment was effected as described for Example 1, except that 680 g of the initially distilled-out methanol (methanol content 93%, containing 7.9 g of free hydroxylamine) recovered by distillation in Example 1 was re-used as a bad solvent in the step of precipitating the dissolved sulfates. The obtained free hydroxylamine aqueous solution was almost equivalent to that obtained in Example in both yield and quality.

Example 3

An experiment was effected as described in Example 1, except that 34.6 g of the final distillation residue produced in Example 1 was re-used as the raw material for liberation. Since the residue was recycled, the yield improved, and the quality was equivalent to that of Example 1.

Effects of the Invention

In the reaction between a hydroxylammonium salt and an alkali generally adopted in recent years as a method for obtaining free hydroxylamine, the operation of separating a large amount of the salt produced by this reaction from the reaction system is important. In this invention, after efficient reaction in an aqueous solution, a lower alcohol is mixed with the reaction system, to allow most of the produced salt to be separated and removed. This also has an advantage that the subsequent distillation operation can be simplified. Furthermore, since the lower alcohol used can be recovered by distillation for recycling, this process is effective in view of economy and environmental conservation. This invention can provide a highly pure and highly concentrated free hydroxylamine aqueous solution substantially not containing any salt or organic substance as a product.

What is claimed is:

1. A process for obtaining a free hydroxylamine aqueous solution, comprising the steps of reacting an aqueous solution or slurry containing hydroxylammonium sulfate with an alkali, to obtain an aqueous reaction solution or slurry containing free hydroxylamine and dissolved or partially precipitated sulfates; mixing the obtained reaction solution or slurry and a lower alcohol, to precipitate solid sulfates; separating a solution containing the lower alcohol and water distillation from the aqueous solution remaining after separating and removing the solid sulfates; and obtaining a free hydroxylamine aqueous solution from the remaining solution by distillation under reduced pressure.

2. A process for producing a free hydroxylamine aqueous solution, according to claim 1, wherein the lower alcohol is an aliphatic alcohol with 1 to 3 carbon atoms.

3. A process for producing a free hydroxylamine aqueous solution, according to claim 1, wherein the lower alcohol is methanol.

4. A process for producing a free hydroxylamine aqueous solution, according to any one of claims 1 through 3, wherein the alkali is ammonia or sodium hydroxide.

5. A process for producing a free hydroxylamine aqueous solution, according to any one of claims 1 through 3, where the alkali is ammonia gas.

6. A process for producing a free hydroxylamine aqueous solution, according to claim 1, wherein a solution containing sodium alcoholate is further used as an alkali.

7. A process for producing a free hydroxylamine aqueous solution, according to claim 1, wherein a solution containing sodium alcoholate is further used as an alkali.

8. A process for producing a free hydroxylamine aqueous solution, according to claim 1, wherein a hydroxylamine stabilizer exists in the system containing hydroxylamine.

9. A process for producing a free hydroxylamine aqueous solution, according to claim 1, wherein a solution containing the lower alcohol and some of water is separated by distillation at a temperature of 60° C. or lower.

10. A process for producing a free hydroxylamine aqueous solution, according to claim 1, wherein the free hydroxylamine aqueous solution is obtained by distillation at a temperature of 80° C. or lower.

11. A process for producing a free hydroxylamine aqueous solution, according to claim 1, wherein after the free hydroxylamine aqueous solution is obtained by distillation, some or all of the residue is recycled in the reaction system.

12. A process for producing a free hydroxylamine aqueous solution, according to claim 1, wherein the solution containing the lower alcohol and some of water separated by distillation is recycled in the reaction system.

13. A process for producing a free hydroxylamine aqueous solution, according to claim 1, wherein the lower alcohol is rectified and concentrated from the solution containing the lower alcohol and some of water separated by distillation, and is recycled in the reaction system.

14. A process for producing a free hydroxylamine aqueous solution, according to claim 1, which comprises a step of mixing sulfuric acid with the aqueous solution remaining after separating and removing the lower alcohol by the rectification and concentration operation, to recover the partially dissolved free hydroxylamine as hydroxylammonium sulfate.

15. A process for producing a free hydroxylamine aqueous solution, according to claim 14, wherein the recovered hydroxylammonium sulfate aqueous solution is recycled in the reaction system after or without concentrating it.

16. A process for producing a free hydroxylamine aqueous solution, according to claim 1, which comprises a step of obtaining a diluted free hydroxylamine aqueous solution by distillation from the solution remaining after separating the solution containing the lower alcohol and some of water by distillation, and recovering a highly concentrated free hydroxylamine aqueous solution as a distillate.

17. A process for producing a free hydroxylamine aqueous solution, according to claim 16, wherein sulfuric acid is mixed with the distilled-out diluted free hydroxylamine aqueous solution or highly concentrated free hydroxylamine aqueous solution, to prepare a hydroxylammonium sulfate aqueous solution, and water is separated by distillation from the hydroxylammonium sulfate aqueous solution, to make a highly concentrated hydroxylammonium sulfate aqueous solution which is recycled in the reaction system.

18. A process for producing a free hydroxylamine aqueous solution, according to claim 1, wherein a hydroxylamine stabilizer is added to the obtained free hydroxylamine aqueous solution.

19. A process for producing a free hydroxylamine aqueous solution, according to claim 8 or 18, wherein the stabilizer is 8-aminoquinoline.

20. A process for producing a free hydroxylamine aqueous solution, according to claim 1, wherein the obtained free hydroxylamine aqueous solution is treated in a rectifying step, for concentrating to achieve a free hydroxylamine concentration of 30 wt % or more.

21. A process for producing a free hydroxylamine aqueous solution, according to claim 1, wherein after the sulfates precipitated in the reaction are separated and removed, a lower alcohol is added and mixed.

22. A process for producing a free hydroxylamine aqueous solution, according to claim 21, which comprises a step of washing the separated sulfates by the lower alcohol.

23. A process for producing a free hydroxylamine aqueous solution, according to claim 22, wherein the lower alcohol used for washing the separated sulfates and the lower alcohol separated by distillation are recycled together or individually in the reaction system.

24. A process for producing a free hydroxylamine aqueous solution, according to claim 1, which comprises a step of adding powdery hydroxylamine sulfate and an alkali to the solution remaining after separating and removing the sulfates precipitated in the reaction, and separating and removing the precipitated sulfates.

25. A process for producing a free hydroxylamine aqueous solution, according to claim 1, wherein hydroxylammonium sulfate and an alkali are added continuously or batch-wise to the reactor, and the sulfates precipitated continuously or batch-wise are separated and removed.

26. A process for producing a free hydroxylamine aqueous solution, according to claim 25, wherein after the operation that hydroxylammonium sulfate and an alkali are added continuously or batch-wise to the reactor, and the sulfates precipitated continuously or batch-wise are separated and removed is repeated, the lower alcohol is added.

27. A process for producing a free hydroxylamine aqueous solution, according to claim 26, wherein the free hydroxylamine concentration in the free hydroxylamine aqueous solution remaining after separating the lower alcohol and some of water by distillation is adjusted to 30 wt % or more by distillation under reduced pressure.

28. A process for producing a free hydroxylamine aqueous solution, according to claim 26, wherein the free hydroxylamine concentration in the free hydroxylamine aqueous solution obtained by distillation from the solution remaining after separating the lower alcohol and some of water by distillation is adjusted to 35 wt % or more by distillation under reduced pressure.

29. A process for producing a free hydroxylamine aqueous solution, according to claim 27 or 28, wherein 8-aminoquinoline is added as a hydroxylamine stabilizer to the free hydroxylamine aqueous solution.

30. A process for producing a free hydroxylamine aqueous solution, according to claim 1, wherein the obtained free hydroxylamine aqueous solution is treated in a rectifying step, for concentrating to achieve a free hydroxylamine concentration of 30 to 80 wt %.

* * * * *